US010227052B2

(12) United States Patent
Nakagawa

(10) Patent No.: US 10,227,052 B2
(45) Date of Patent: Mar. 12, 2019

(54) ELASTIC TUBULAR BODY

(71) Applicant: SUMITOMO WIRING SYSTEMS, LTD., Mie (JP)

(72) Inventor: Tetsuya Nakagawa, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 3 days.

(21) Appl. No.: 15/443,366

(22) Filed: Feb. 27, 2017

(65) Prior Publication Data
US 2017/0246999 A1 Aug. 31, 2017

(30) Foreign Application Priority Data

Feb. 29, 2016 (JP) .................................. 2016-037230

(51) Int. Cl.
*F16L 11/00* (2006.01)
*B60R 16/02* (2006.01)
*F16L 11/11* (2006.01)
*H02G 3/04* (2006.01)

(52) U.S. Cl.
CPC .......... *B60R 16/0222* (2013.01); *F16L 11/11* (2013.01); *H02G 3/0468* (2013.01)

(58) Field of Classification Search
CPC ..... B60R 16/0222; H02G 3/0468; F16L 11/11
USPC ..... 138/106, 110, 109, 121, 122; 296/146.7, 296/146.9, 208; 174/152 G, 153 G
See application file for complete search history.

(56) References Cited

U.S. PATENT DOCUMENTS

| 6,081,964 | A   | * | 7/2000  | Mori ................. B60R 16/0222 16/2.2 |
| 6,737,583 | B2  | * | 5/2004  | Saeki ............... B60R 16/0222 16/2.1 |
| 6,779,243 | B2  | * | 8/2004  | Nakata ............. B60R 16/0222 174/153 G |
| 8,502,079 | B2  | * | 8/2013  | Shitamichi ........ B60R 16/0222 16/2.1 |
| 8,584,315 | B1  | * | 11/2013 | Adachi ................. H02G 3/22 16/2.1 |
| 2003/0098171 | A1 | * | 5/2003 | Sato .................. B60R 16/0222 174/663 |
| 2008/0230257 | A1 | * | 9/2008 | Kawasaki .......... B60R 16/0222 174/153 G |

(Continued)

FOREIGN PATENT DOCUMENTS

JP    2009-143328    7/2009

*Primary Examiner* — James Hook
(74) *Attorney, Agent, or Firm* — Greenblum & Bernstein, P.L.C.

(57) ABSTRACT

An elastic tubular body includes a grommet fitted to an opening edge of a mounting hole of a support body, a flared portion formed in a flare shape and deformable so as to invert an inner face and an outer face and having a large diameter edge coupled to the grommet; and a bellows-like tube of a bellows-like tubular shape having a smaller diameter than an inner diameter of a small diameter edge of the flared portion, a first end of the bellows-like tube connected with the small diameter edge of the flared portion. The flared portion is configured to be in a state projecting from the grommet or in a state where the outer face is reversed to enter inside the inner face and store the flared portion in a storage space of the grommet. The bellows-like tube is stored inside the flared portion stored in the storage space.

4 Claims, 8 Drawing Sheets

(56) References Cited

U.S. PATENT DOCUMENTS

| | | | |
|---|---|---|---|
| 2010/0269943 A1* | 10/2010 | Arai | E04F 17/04 138/119 |
| 2010/0283288 A1 | 11/2010 | Toyozumi et al. | |
| 2013/0199823 A1* | 8/2013 | Kanai (Popovici) | B60R 16/0222 174/152 G |
| 2014/0041899 A1* | 2/2014 | Inagaki | B60R 16/0215 174/152 G |
| 2015/0101842 A1* | 4/2015 | Han | B60R 16/0222 174/50.57 |

* cited by examiner

PRIOR ART

ELASTIC TUBULAR BODY

CROSS-REFERENCE TO RELATED APPLICATIONS

The present application claims priority under 35 U.S.C. § 119 of Japanese Application No. 2016-037230, filed on Feb. 29, 2016, the disclosure of which is expressly incorporated by reference herein in its entirety.

BACKGROUND OF THE INVENTION

1. Field of the Invention

The present invention relates to an elastic tubular body protecting a wire harness routed at a location where a support body is mounted to be capable of opening and closing with respect to a second support body.

2. Description of Related Art

In vehicles such as automobiles, for example, a grommet that is waterproof and flexible is used for routing a wire harness between a vehicle body side and a door side. In addition, when routing the wire harness sheathed by the grommet between the vehicle body side and the door side, a configuration is desired such that the wire harness is not caught between the vehicle body side and the door side when mounting the door to the vehicle body.

Conventionally, to prevent a door wire harness from being caught after mounting the door, a routing structure is known such that the door wire harness is routed toward the vehicle body from a space between an indoor side of a door inner panel and a door trim so as not to pass through a through hole of the door (see Japanese Patent Laid-open Publication No. 2009-143328, for example).

FIG. 8 illustrates a routing structure of a door wire harness equivalent to that shown in FIG. 1 of Japanese Patent Laid-open Publication No. 2009-143328. The routing structure of the door wire harness provides an accommodating recess 84 dented in a rectangular shape to a top portion of a door trim 83 on a door 80 side facing a vehicle body outer panel 82 of a vehicle body 81 with a space between the door 80 and the vehicle body outer panel 82. When the door is closed, a bending portion bending a wire harness W/H sheathed by a grommet 85 in an S shape is accommodated in the accommodating recess 84.

The routing structure described in Japanese Patent Laid-open Publication No. 2009-143328 can prevent the wire harness from being caught after mounting the door to the vehicle body, however when mounting the door to the vehicle body, the wire harness is hanging down and it is not possible to completely prevent the wire harness from being caught. Especially in recent years, there is a demand to automate a process of mounting the door to the vehicle body. The routing structure described in Japanese Patent Laid-open Publication No. 2009-143328 may be applied to automation, however the wire harness still may be caught because of the wire harness hanging down.

SUMMARY OF THE INVENTION

The present invention is conceived to solve the above-noted circumstance and provides an elastic tubular body capable of reliably preventing a wire harness from being caught, the wire harness being routed between support bodies when mounting a second support body to a first support body so as to be capable of opening and closing.

To solve the above-noted circumstance, the elastic tubular body according to the present invention includes a grommet, a flared portion, and a bellows-like tube. The grommet is fitted to an opening edge of a mounting hole of a support body. The flared portion is formed in a flare shape and is deformable so as to be capable of inverting an inner face and an outer face, and a large diameter edge of the flared portion is coupled to the grommet. The bellows-like tube is formed in a bellows-like tubular shape with an annular peak having a smaller diameter than an inner diameter of a small diameter edge of the flared portion and an annular valley having a smaller diameter than the annular peak, the annular peak and annular valley alternatingly continued, and a first end of the bellows-like tube is connected with the small diameter edge of the flared portion. The elastic tubular body has a flexible linear body passing through the mounting hole and inserted through the grommet, flared portion, and bellows-like tube. The flared portion is provided so as to be in condition projecting from the grommet or in a condition where the outer face is reversed to enter inside the inner face and store the flared portion in a storage space provided to the grommet. The bellows-like tube is stored inside the flared portion stored in the storage space.

With this configuration, in the elastic tubular body according to the present invention, when mounting the support body with the grommet mounted, the flared portion enters inside the inner face by reversing the outer face and is stored in the storage space provided to the grommet. The bellows-like tube is stored inside the flared portion stored inside the storage space of the grommet. Therefore, the wire harness to be protected by being inserted through the grommet, flared portion, and bellows-like tube can be prevented from being in a free state and hanging down, and thus this configuration can reliably prevent the wire harness from being caught between the support bodies.

In addition, the elastic tubular body with the above noted configuration may be configured such that the grommet is fitted to the opening edge of the mounting hole of the support body (either one of a door hinge-coupled to the vehicle body so as to be capable of opening and closing or the vehicle body), and further includes a second grommet coupled to a second end of the bellows-like tube and fitted to the opening edge of the support body (the other one of the door or the vehicle body), and may be configured to further include a coupling portion coupling the grommet and the second grommet such that the grommet and the second grommet can be separated from each other.

With this configuration, by mutually coupling the grommet and the second grommet using the coupling portion, when mounting the support body, the elastic tubular body according to the present invention can reduce an interval between the flared portion and the bellows-like tube compared to a case where the grommet and the second grommet are not coupled to each other, and thus this configuration can more reliably prevent the wire harness from being caught between the support bodies.

Further, in the elastic tubular body with the above noted configuration, the coupling portion may be configured with an engaging projection formed on a surface of the grommet opposing the second grommet and an engagement recess provided to a surface of the second grommet opposing the grommet and corresponding to the engaging projection, the engagement recess engaging with the engaging projection.

With this configuration, the elastic tubular body according to the present invention can facilitate operations of coupling and uncoupling between the grommet and the second grommet.

The present invention provides the elastic tubular body capable of reliably preventing the wire harness from being caught, the wire harness being routed between the support bodies when mounting the second support body to the support body so as to be capable of opening and closing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
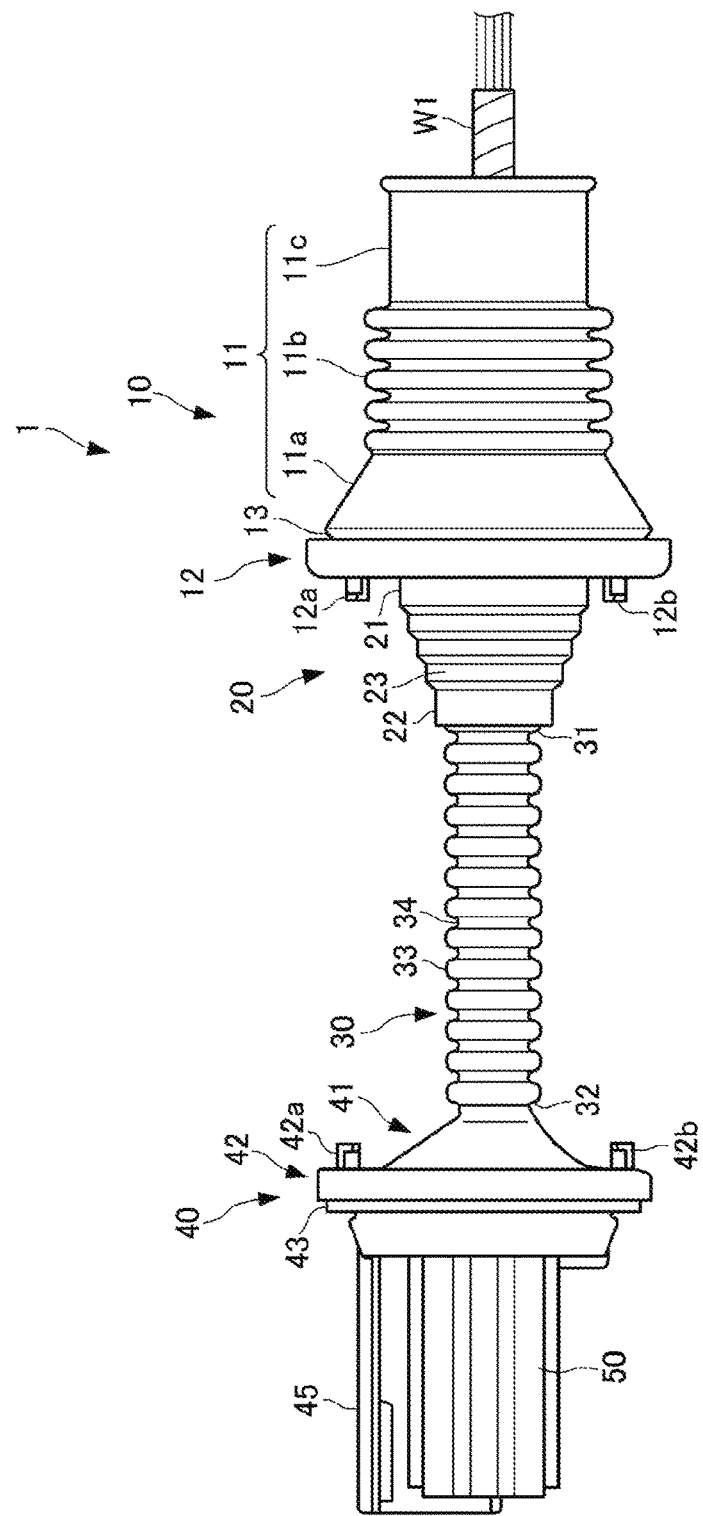
FIG. 1 is a front view illustrating a state where an elastic tubular body according to an embodiment of the present invention is in use.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an elastic tubular body according to an embodiment of the present invention is described with reference to the drawings.

FIGS. 1 to 5A and 5B illustrate the elastic tubular body according to the embodiment of the present invention. An elastic tubular body 1 protects a wire harness W1 routed at a location where a support body is mounted to be capable of opening and closing with respect to a second support body. In particular, according to the present embodiment, an example is given to describe the elastic tubular body 1 protecting the wire harness W1 routed between a vehicle body side and a door side of an automobile.

As shown in FIGS. 1 to 4, the elastic tubular body 1 includes a first grommet 10, a flared portion 20, a bellows-like tube 30, and a second grommet 40. In the elastic tubular body 1, the wire harness W1 is inserted through an interior of the grommet 10, flared portion 20, bellows-like tube 30, and second grommet 40.

The grommet 10 is configured with a molding made of rubber, for example, in which a tube 11 and a base 12 are integrally molded. The tube 11 includes a conical tube 11a, a bellows-like tube 11b, and a cylinder 11c and an annular seat 13 is formed on one end side of the conical tube 11a. In the grommet 10, a storage space 11d is formed storing the flared portion 20 (described later) inside the conical tube 11a (see FIG. 2). The grommet 10 is configured such that the seat 13 can be fitted to an opening edge of a mounting hole 71a on a door 71, for example, which is one of the support bodies hinge-coupled and capable of mutually opening and closing (see FIGS. 6 and 7).

Figure 5A:
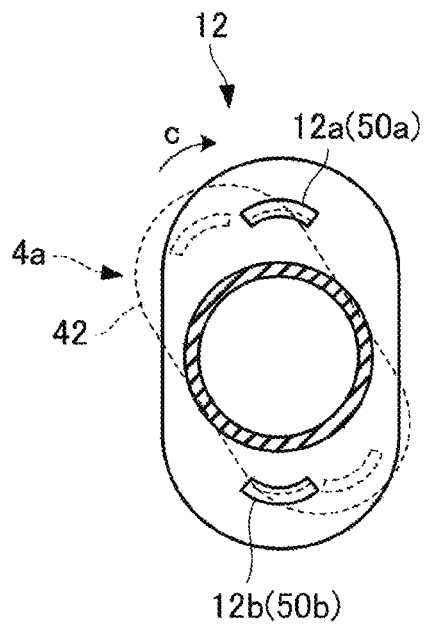
FIG. 5A illustrates a partial cross-sectional structure along line A-A of the elastic tubular body of FIG. 2.

In addition, the grommet 10 is provided with engaging projections 12a and 12b on an opposite surface of the base 12 from the tube 11. As shown in FIG. 5A, the engaging projections 12a and 12b have a shape capable of engaging with engagement recesses 42a and 42b, respectively, provided to a base 42 of the second grommet 40 (described later) (see FIG. 5B).

The flared portion 20 is formed in a flare shape and is deformable so as to be capable of inverting an inner face and an outer face. A large diameter edge 21 is coupled to the grommet 10 and a small diameter edge 22 is coupled to a first end of the bellows-like tube 30.

Figure 2:
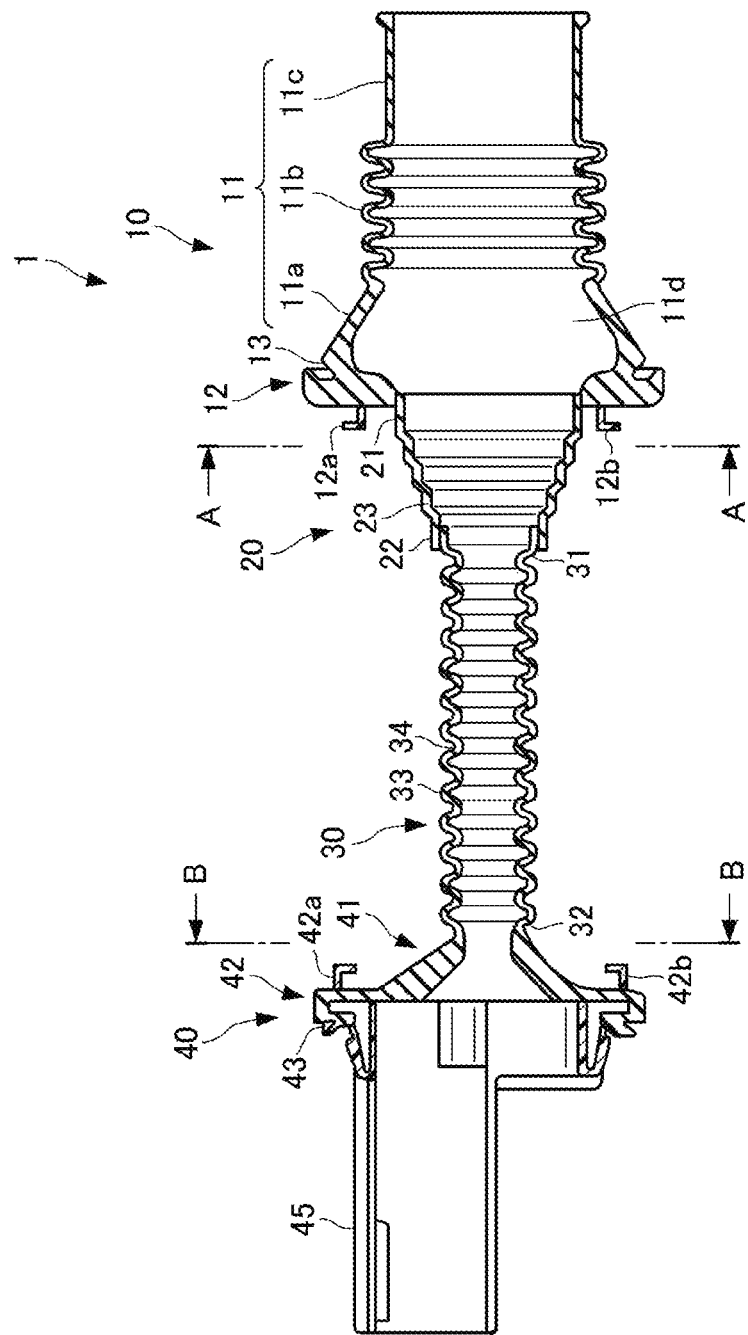
FIG. 2 illustrates a cross-sectional structure of the elastic tubular body of FIG. 1.

The flared portion 20 is configured with the molding made of rubber, for example, which is integrally provided with a plurality of rings 23 having successively smaller diameter in order from the large diameter edge 21 toward the small diameter edge 22. In the flared portion 20, each of the rings 23 can mutually store the smaller diameter ring 23 in the adjacent larger diameter ring 23, and from a stored state, the smaller diameter ring 23 can be extended from the adjacent larger diameter ring 23. FIGS. 1 and 2 illustrate a structure of the elastic tubular body 1 where the flared portion 20 has the smaller diameter rings 23 extended from the respective adjacent larger diameter rings 23.

Figure 3:
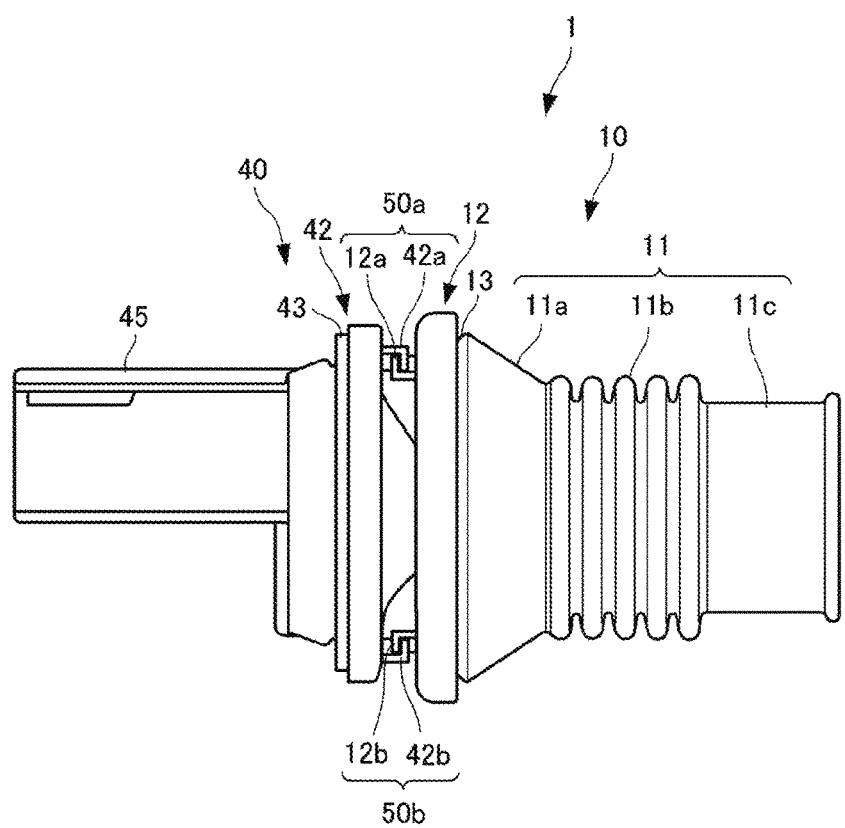
FIG. 3 is a front view illustrating a state where a flared portion of the elastic tubular body according to the embodiment of the present invention is stored during use.
Figure 4:
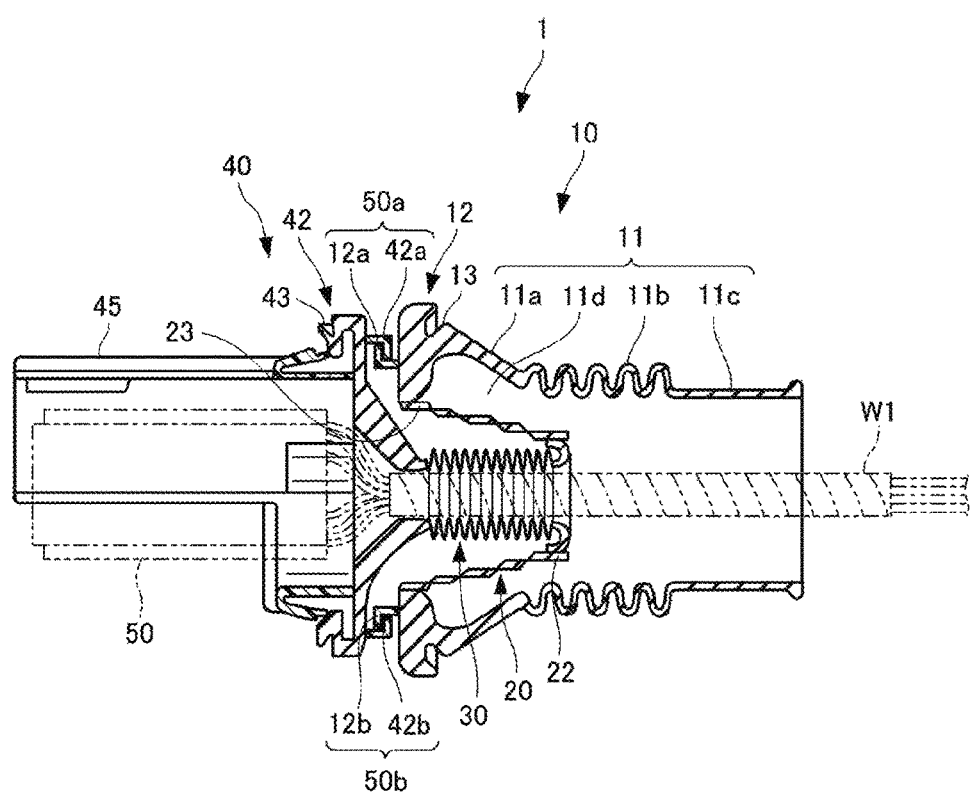
FIG. 4 illustrates a cross-sectional structure of the elastic tubular body of FIG. 3.

In addition, because the flared portion 20 is configured with the rubber molding, the flared portion 20 is deformable so as to be capable of inverting the inner face and the outer face. FIGS. 3 and 4 illustrate a structure of the flared portion 20 of the elastic tubular body 1 when the outer face is reversed to enter inside the inner face.

At this time, when the small diameter edge 22 is pressed toward the large diameter edge 21 from the state illustrated in FIGS. 1 and 2, a total length of the flared portion 20 shrinks while the smaller diameter rings 23 are successively stored in the adjacent larger diameter rings 23. Furthermore, when the small diameter edge 22 is pressed as described above, the face which has been the inner face is reversed to become the outer face, creating a reversed state where the smaller diameter rings 23 are extended from the respective adjacent larger diameter rings 23 (see FIGS. 3 and 4).

Accordingly, in the elastic tubular body 1 according to the present embodiment, the flared portion 20 is configured to have a projecting state projecting from the base 12 of the grommet 10 and a state where the outer face is reversed to enter inside the inner face and store the flared portion 20 in the storage space 11d provided to the grommet 10. At this time, the bellows-like tube 30 (described later) is stored inside the flared portion 20 stored in the storage space 11d of the grommet 10.

The bellows-like tube 30 is formed in a bellows-like tubular shape where an annular peak 33 having a smaller diameter than an inner diameter of the small diameter edge 22 of the flared portion 20 and an annular valley 34 having a smaller diameter than the annular peak 33 are alternatingly continued, and the first end of the bellows-like tube 30 is connected with the small diameter edge 22 of the flared portion 20.

When the flared portion 20 is in the state projecting from the grommet 10 (see FIGS. 1 and 2), the bellows-like tube 30 has the bellows-like shape maintaining a fixed interval between the annular peaks 33 and the annular valleys 34. When the flared portion 20 is in the state being stored in the storage space 11d of the grommet 10 (see FIGS. 3 and 4), the bellows-like tube 30 is configured to have a smaller interval than the above mentioned fixed interval between the annular peaks 33 and the annular valleys 34.

However, the state where the flared portion 20 is stored in the storage space 11d of the grommet 10 and the interval between the annular peaks 33 and the annular valleys 34 of the bellows-like tube 30 is smaller than the fixed interval (see FIGS. 3 and 4) is achieved by coupling the base 12 of the grommet 10 and the base 42 of the second grommet 40 via coupling portions 50a and 50b (described later).

In other words, the second grommet 40 is coupled to a second end of the bellows-like tube 30. The second grommet 40 is configured with a molding made of rubber, for example, in which a tube 41 and a base 42 having a seat 43 are integrally molded. The second grommet 40 is configured such that the seat 43 can be fitted to an opening edge of a mounting hole 73a on a vehicle body panel 73, for example, which is a second support body hinge-coupled and capable of mutually opening and closing (see FIGS. 5A, 5B, and 6).

Figure 5B:
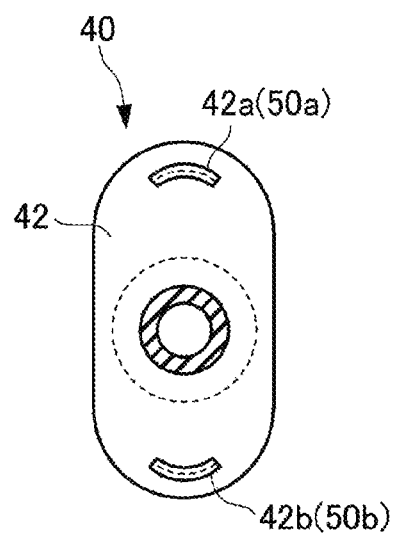
FIG. 5B illustrates a partial cross-sectional structure along line B-B of the elastic tubular body of FIG. 2.

In addition, the second grommet 40 is provided with the engagement recesses 42a and 42b on the opposite surface of the base 42 from the seat 43. As shown in FIG. 5B, the engagement recesses 42a and 42b have a shape capable of engaging with the engaging projections 12a and 12b, respectively, provided to the base 12 of the grommet 10 (see FIG. 5A). The engaging projection 12a and the engagement recess 42a, and the engaging projection 12b and the engagement recess 42b, constitute coupling portions 50a and 50b of the present invention respectively (see FIGS. 5A and 5B).

More particularly, as shown in FIGS. 5A and 5B, the coupling portions 50a and 50b of the elastic tubular body 1 are configured with the engaging projections 12a and 12b formed on the surface of the grommet 10 opposing the second grommet 40 and the engagement recesses 42a and 42b provided to the surface of the second grommet 40 opposing the grommet 10 and corresponding to the engaging projections 12a and 12b, the engagement recesses 42a and 42b engaging with the engaging projections 12a and 12b.

As shown in FIG. 5A for example, the elastic tubular body 1 having the above noted coupling portions 50a and 50b can couple the grommet 10 and the second grommet 40 by bringing the second grommet 40 (indicated by a dotted line for convenience) to face the grommet 10 such that the engagement recess 42a and the engaging projection 12a, and the engagement recess 42b and the engaging projection 12b are brought close together, and by rotating the second grommet 40 in a direction illustrated by an arrow c.

Further, in the state where the grommet 10 and the second grommet 40 are coupled as mentioned above, the grommet 10 and the second grommet 40 can be uncoupled by rotating the second grommet 40 in the direction opposite to the direction indicated by the arrow c, for example.

Figure 6:
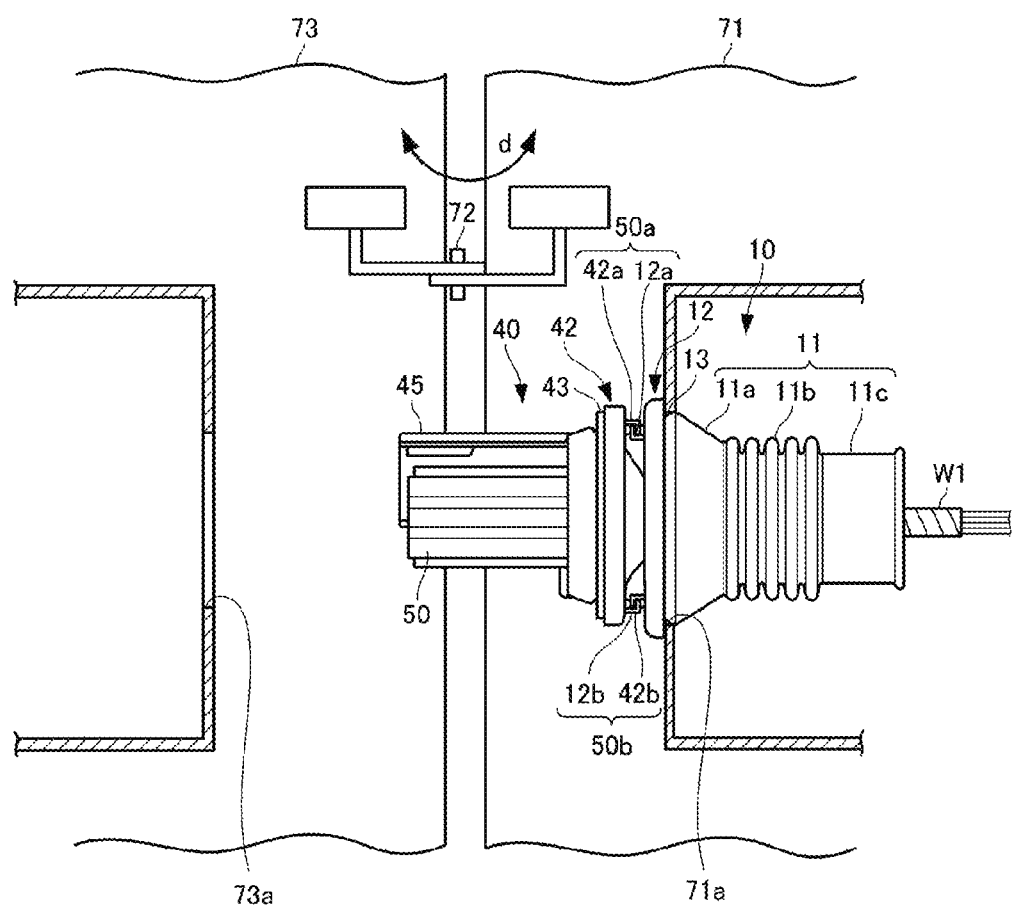
FIG. 6 is a front view illustrating a state where the elastic tubular body according to the embodiment of the present invention is mounted onto a vehicle body door during use.
Figure 7:
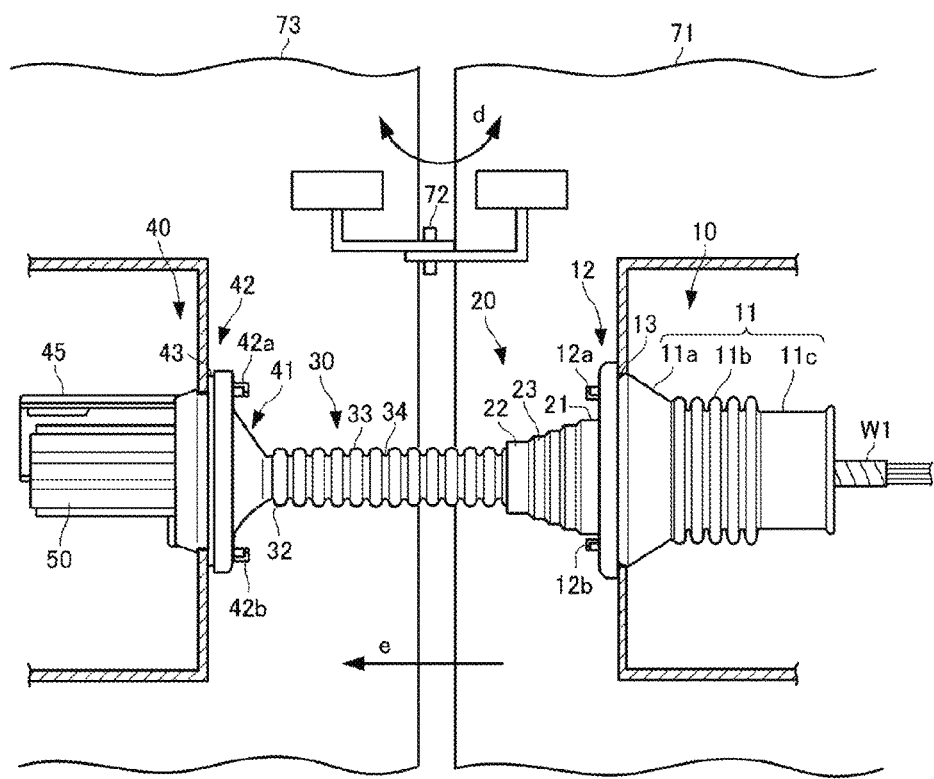
FIG. 7 is a front view illustrating a state where the elastic tubular body according to the embodiment of the present invention is mounted between the vehicle door side and the vehicle body side during use.
Figure 8:
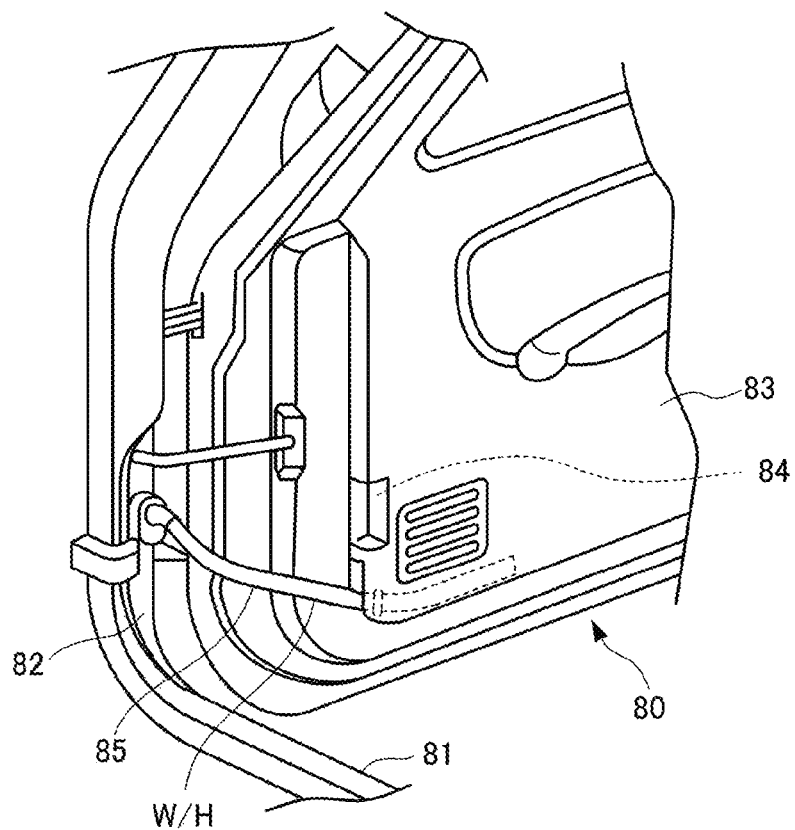
FIG. 8 illustrates a routing structure of a conventional door wire harness.

Next, a procedure of mounting the elastic tubular body 1 having the above noted configuration is described with reference to FIGS. 6 and 7. In FIGS. 6 and 7, an example is given to describe the elastic tubular body 1 where the grommet 10 is mounted to the vehicle door 71 which is a first support body and the second grommet 40 is mounted to the vehicle body panel 73 which is a second support body.

In the vehicle illustrated in FIGS. 6 and 7, the door 71 is hinge-coupled to the vehicle body panel 73 using a hinge 72 and is capable of opening and closing in both directions indicated by an arrow d with respect to the vehicle body panel 73. The door 71 is provided with the mounting hole 71a of the grommet 10 and the vehicle body panel 73 is provided with the mounting hole 73a of the second grommet 40.

In the mounting work, the elastic tubular body 1 is provided where the wire harness W1 is inserted through an interior of the grommet 10, flared portion 20, bellows-like tube 30, and second grommet 40, and the grommet 10 and the second grommet 40 are coupled via the coupling portions 50a and 50b.

Next, the prepared elastic tubular body 1 is mounted to the door 71 prior to mounting to the vehicle body. During this work, the elastic tubular body 1, including an end portion of the wire harness W1, is inserted through the mounting hole 71a of the door 71 from the tube 11 side, and the wire harness W1 is pulled until the conical tube 11a passes through the mounting hole 71a. Accordingly, a first end of the grommet 10 can be mounted to the door 71 in a state where the seat 13 is fitted to the opening edge of the mounting hole 71a provided to the door 71 and the elastic tubular body 1 has the grommet 10 and the second grommet 40 coupled to each other.

Then, the door 71 having the seat 13 of the grommet 10 fitted to the mounting hole 71a is mounted to the vehicle body panel 73 so as to be capable of opening and closing using the hinge 72 as shown in FIG. 6. At this point, the elastic tubular body 1 is in a state where the grommet 10 and the second grommet 40 are coupled by the coupling portions 50a and 50b. Therefore, when mounting the door 71 to the vehicle, the wire harness W1 sheathed by the elastic tubular body 1 is not caught between the door 71 and the vehicle body panel 73.

After mounting of the door 71 is finished, the grommet 10 and the second grommet 40 are uncoupled. As shown in FIG. 7, the second grommet 40 is stretched toward the vehicle body panel 73 in a direction indicated by an arrow e.

When the second grommet 40 reaches the mounting hole 73a of the vehicle body panel 73, the wire harness W1 is further pulled in the direction indicated by the arrow e, through the mounting hole 73 from a connector 45 side until the seat 43 of the base 42 of the second grommet 40 is fitted to the opening edge of the mounting hole 73a of the vehicle body panel 73. Accordingly, the elastic tubular body 1 can be mounted between the vehicle body panel 73 and the door 71 in a state where the grommet 10 and the second grommet 40 are uncoupled.

In this state, the elastic tubular body 1 has the grommet 10 fitted to the mounting hole 71a of the door 71 and the second grommet 40 fitted to the mounting hole 73a of the vehicle body panel 73. The wire harness W1 in this state is sheathed by the elastic tubular body 1 in a non-free state, and therefore, the wire harness W1 is not caught when opening and closing the door 71.

In this way, the elastic tubular body 1 according to the present embodiment has a configuration able to provide a state where the outer face of the flared portion 20 is reversed to enter inside the inner face and store the flared portion 20 in the storage space 11d provided to the grommet 10. Therefore, the wire harness W1 can be prevented from hanging down by pre-mounting the elastic tubular body 1 having the flared portion 20 stored in the above state to the door 71 prior to mounting the door 71. Accordingly, thereafter, in a case where the door 71 is mounted in an automation process (see FIG. 6), the wire harness W1 being caught between the door 71 and the vehicle body panel 73 (in other words, the wire harness W1 being caught between the door 71 and the vehicle body panel 73) can be inhibited.

Further, after mounting the door 71 to the vehicle body, the second grommet 40 is uncoupled from the grommet 10, the flared portion 20 is extended by a desired length from the storage space 11d so as to be in a state where the flared portion 20 is projecting from the grommet 10, and the connector 45 on a front end of the second grommet 40 may be connected to an opposing connector after the second grommet 40 is mounted to the mounting hole 73a of the vehicle body panel 73.

In FIGS. 6 and 7, the elastic tubular body 1 having the grommet 10 fitted to the vehicle door 71 and the second grommet 40 fitted to the vehicle body panel 73 is described. However, a reversed configuration is also possible, in which the grommet 10 may be fitted to the vehicle body panel 73 and the second grommet 40 may be fitted to the door 71.

In addition, as for location where the elastic tubular body 1 according to the present embodiment is to be arranged, an example is given based on the elastic tubular body 1 being arranged between the vehicle body panel 73 and the door 71 of the vehicle. However, the present embodiment is not limited to this and the elastic tubular body 1 can be arranged between various support bodies having a structure which mounts a second support body to the support body so as to be capable of opening and closing.

With this configuration, the elastic tubular body 1 according to the present embodiment includes the grommet 10, flared portion 20, and bellows-like tube 30. The grommet 10 is fitted to the opening edge of the mounting hole 71a of the support body (such as the door 71). The flared portion 20 is formed in the flare shape and is deformable so as to be capable of inverting the inner face and the outer face, and the large diameter edge 21 is coupled to the grommet 10. The bellows-like tube 30 is formed in the bellows-like tubular shape with the annular peak 33 having the smaller diameter than the inner diameter of the small diameter edge 22 of the flared portion 20 and the annular valley 34 having the smaller diameter than the annular peak 33, the annular peak 33 and annular valley 34 alternatingly continued, and the first end of the bellows-like tube 30 is connected with the small diameter edge 22 of the flared portion 20. The elastic tubular body 1 has the wire harness W1 having a flexible linear body passing through the mounting hole 71a inserted through the grommet 10, flared portion 20, and bellows-like tube 30. The flared portion 20 is provided so as to be in the state projecting from the grommet 10 or the state where the outer face is reversed to enter inside the inner face and store the flared portion 20 in the storage space 11d provided to the grommet 10. The bellows-like tube 30 is stored inside the flared portion 20 stored in the storage space 11d.

With this configuration, in the elastic tubular body 1 according to the present embodiment, when mounting the door 71, with the grommet 10 mounted, to the second support body (such as the vehicle body panel 73), the outer face of the flared portion 20 is reversed to enter inside the inner face and store the flared portion 20 in the storage space 11d provided to the grommet 10, and the bellows-like tube 30 is stored inside the flared portion 20 stored in the storage space 11d. Therefore, the wire harness W1, which is to be protected by being inserted through the grommet 10, flared portion 20, and bellows-like tube 30, being in a free state and hanging down can be avoided, and the wire harness W1 being caught between the support bodies can be reliably prevented.

In addition, the elastic tubular body 1 with the above noted configuration may be configured such that the grommet 10 is fitted to the opening edge of the mounting hole 71a or 73a of the support body (either one of the door 71 hinge-coupled to the vehicle body so as to be capable of opening and closing or the vehicle body panel 73), and may further include the second grommet 40 coupled to the second end of the bellows-like tube 30 and fitted to the opening edge of the mounting hole 71a or 73a of the second support body (the other one of the door 71 or the vehicle body panel 73), and may be configured to further include the coupling portions 50a and 50b coupling the grommet 10 and the second grommet 40 such that the grommet 10 and the second grommet 40 can be separated from each other.

With the above configuration, by mutually coupling the grommet 10 and the second grommet 40 via the coupling portions 50a and 50b, when mounting the door 71, the interval between the flared portion 20 and the bellows-like tube 30 can be reduced compared to a case where the grommet 10 and the second grommet 40 are not coupled to each other, and the wire harness W1 can be reliably prevented from being caught between the support bodies.

Further, in the elastic tubular body 1 according to the present embodiment, the coupling portions 50a and 50b may be configured with the engaging projections 12a and 12b formed on the surface of the grommet 10 opposing the second grommet 40 and the engagement recesses 42a and 42b provided to the surface of the second grommet 40 opposing the grommet 10 and corresponding to the engagement projections 12a and 12b, the engagement recesses 42a and 42b engaging with the engaging projections 12a and 12b.

With this configuration, the elastic tubular body 1 according to the present embodiment can facilitate coupling and uncoupling between the grommet 10 and the second grommet 40.

The present invention is not limited to the above-described embodiment and the technical scope of the claims includes various modified embodiments without deviating from the scope of the invention.

As described above, the elastic tubular body according to the present invention can reliably prevent the wire harness routed between the support bodies being caught when mounting the second support body to the first support body so as to be capable of opening and closing. The elastic tubular body according to the present invention is broadly useful as an elastic tubular body protecting a wire harness routed between various support bodies.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An elastic tubular body comprising:
    a grommet configured to be fitted to an opening edge of a mounting hole of a support body;
    a flared portion formed in a flare shape having a large diameter edge and a small diameter edge and a plurality of rings having successively smaller diameter in order from the large diameter edge to the small diameter edge, and the flared portion being deformable so as to invert an inner face and an outer face, and having the large diameter edge coupled to the grommet; and
    a bellows tube formed in a bellows tubular shape with alternating annular peaks and annular valleys, the annular peaks having a smaller diameter than an inner diameter of the small diameter edge of the flared portion and the annular valleys having a smaller diameter than the annular peaks, a first end of the bellows tube being connected with the small diameter edge of the flared portion,
    the elastic tubular body being configured such that a flexible linear body passing through the mounting hole can be inserted through the grommet, flared portion, and bellows tube,
    wherein
    the flared portion is configured to be in one of a condition projecting from the grommet and a condition in which the outer face is reversed to enter inside the inner face such that the flared portion is stored in a storage space in the grommet, and the bellows tube is stored inside the flared portion stored in the storage space.

2. The elastic tubular body according to claim 1, wherein the grommet is fitted to the opening edge of the mounting hole of the support body, the support body being one of a vehicle body and a door hinge-coupled to the vehicle body so as to be capable of opening and closing and the vehicle body, the elastic tubular body further comprising:
    a second grommet coupled to a second end of the bellows tube and configured to be fitted to an opening edge of a second support body which is the other one of the door and the vehicle body, and
    a coupling portion releasably coupling the grommet and the second grommet such that the grommet and the second grommet can be separated from each other.

3. The elastic tubular body according to claim 2, wherein the coupling portion includes an engaging projection formed on a surface of the grommet opposing the second grommet, and an engagement recess provided to a surface of the second grommet opposing the grommet and corresponding to the engaging projection, the engagement recess engaging with the engaging projection.

4. An elastic tubular body comprising:
    a grommet configured to be fitted to an opening edge of a mounting hole of a support body;
    a flared portion formed in a flare shape and deformable so as to invert an inner face and an outer face, and having a large diameter edge coupled to the grommet; and
    a bellows tube formed in a bellows tubular shape with alternating annular peaks and annular valleys, the annular peaks having a smaller diameter than an inner diameter of a small diameter edge of the flared portion and the annular valleys having a smaller diameter than the annular peaks, a first end of the bellows tube being connected with the small diameter edge of the flared portion,
    the elastic tubular body being configured such that a flexible linear body passing through the mounting hole can be inserted through the grommet, flared portion, and bellows tube,
    wherein the flared portion is configured to be in one of a condition projecting from the grommet and a condition in which the outer face is reversed to enter inside the inner face such that the flared portion is stored in a storage space in the grommet, and the bellows tube is stored inside the flared portion stored in the storage space, and
    wherein the coupling portion includes an engaging projection formed on a surface of the grommet opposing the second grommet, and an engagement recess provided to a surface of the second grommet opposing the grommet and corresponding to the engaging projection, the engagement recess engaging with the engaging projection.

* * * * *